United States Patent [19]

Testard

[11] 4,438,168

[45] Mar. 20, 1984

[54] COMPOSITE HEAT SHIELD

[75] Inventor: Olivier Testard, Bures sur Yvette, France

[73] Assignee: Commissariat a l'Energie Atomique, Paris, France

[21] Appl. No.: 400,888

[22] Filed: Jul. 22, 1982

[30] Foreign Application Priority Data

Jul. 30, 1981 [FR] France ............................... 81 14868

[51] Int. Cl.³ .............................................. B32B 23/02
[52] U.S. Cl. ............................... 428/193; 244/158 A; 244/163; 428/192; 428/197; 428/247; 428/253; 428/255; 428/263; 428/458; 428/131
[58] Field of Search ........................... 244/158 A, 163; 102/105; 428/192, 193, 247, 253, 255, 458, 197, 131

[56] References Cited

U.S. PATENT DOCUMENTS 3,130,112 4/1964 Anderson ............................ 428/253
4,032,681 6/1977 Jonnes ................................. 428/253

FOREIGN PATENT DOCUMENTS 1271068 4/1972 United Kingdom .
2021040 11/1979 United Kingdom .

Primary Examiner—James J. Bell
Attorney, Agent, or Firm—James E. Nilles

[57] ABSTRACT

The shield comprised at least one thermally insulating assembly formed by a reflecting layer and a spacing layer in which the latter is a knitted product. Preferably, the knitted product is tulle, for example of polyester or polyimide, produced by using a monofilament thread. The production process consists of preferably simultaneously performing the cutting of the reflecting layer and the spacing layer so as to form the edges for the said layers and the welding together thereof by these edges, the cutting and welding processes being performed hot.

Application to the thermal insulation of cryogenic instruments carried on spacecraft.

9 Claims, 9 Drawing Figures

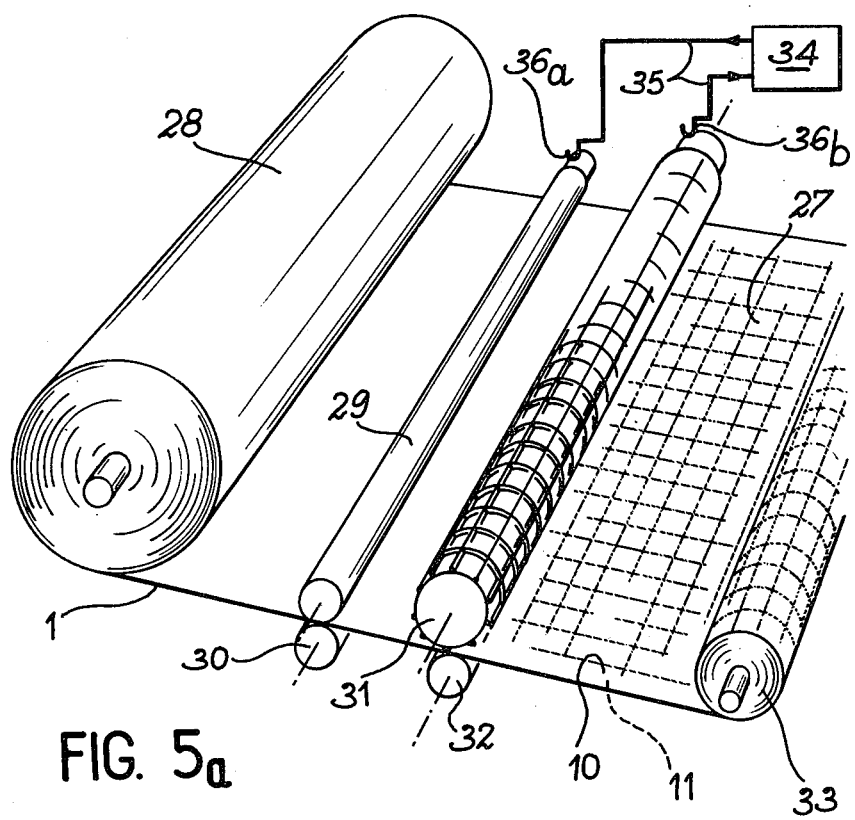
FIG. 5a
FIG. 5b
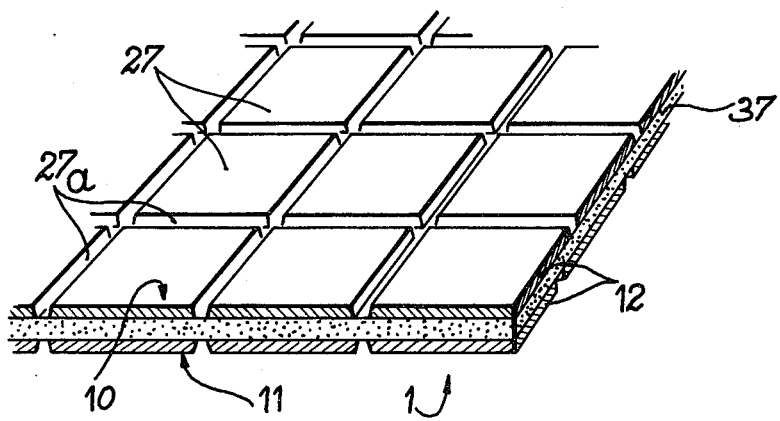

COMPOSITE HEAT SHIELD

BACKGROUND OF THE INVENTION

The present invention relates to a composite heat shield and to a process for the production thereof. It relates more particularly to the thermal insulation of cryogenic instruments carried in spacecraft.

Heat shields are known, which are formed by the superimpositioning of a plurality of composite thermal insulants each comprising a reflecting layer or "reflector" able to reflect electromagnetic radiation and in particular infrared radiation, and a spacing layer or "spacer". The known spacers have a limited junction length between two successive reflecting layers and a limited density. Thus, they are easily compactable. As a result, there is a significant compression of the spacing layers under the effect of acceleration, vibration, etc, which leads to an increase in the number of contacting points between two successive reflectors, which increases the thermal conductivity between the reflectors joined by such spacers. This conductivity is proportional to the total weight of the elementary thermal insulants (a high number for limiting heat transmission by radiation) and consequently to the unitary surface density of the elementary thermal insulants from which the shields are formed.

BRIEF SUMMARY OF THE INVENTION

The invention aims at obviating this disadvantage and is directed at a composite heat shield and to a process for the production thereof.

The invention firstly relates to a heat shield comprising at least one thermally insulating assembly formed by a reflecting layer and a spacing layer, wherein the spacing layer is a tulle or net fabric, i.e. a loose mesh knitted fabric with an extremely low density.

When using this type of spacer, there are few contacts between two successive reflecting layers in the case of a multilayer shield, i.e. having a plurality of said thermally insulating assemblies, or between the reflecting layer and an object to be thermally insulated in the case of a shield having only one reflecting layer and one spacing layer. Moreover, there is a considerable filamentary spread between two successive contacts. Moreover, the use of tulle makes it possible to increase the density of a spacing layer, whilst retaining its rigidity, as a result of the considerable length of its meshes. Thus, there is only a limited compression tendency with respect to this layer under acceleration.

Thus, the heat shield according to the invention has a thermal conductivity which is below that of known composite heat shields.

According to a preferred feature of the heat shield according to the invention, the tulle is produced by means of a monofilament thread, which increases the rigidity of the tulle and consequently its resistance to compression.

According to a special feature of the heat shield according to the invention, the space defined by each spacing layer is under vacuum.

According to another preferred feature of the invention, the reflecting layer is formed from a support material from the group including polyesters and polyimides, which are light-weight materials and have a good thermal behaviour. Preferably, the spacing layer is then made from the same material as the support material of the reflecting layer, because it is to be welded thereto during the production of the composite heat shield and preferably has the same thermal expansion characteristics. However, any other material chosen for its low thermal conduction and low specific gravity, its good mechanical behaviour at all temperatures and its high specific rigidity can also be used.

According to a special feature of the heat shield according to the invention, the reflecting layer has at least one metallic face. For example, both its faces are metallized.

According to another special feature, the reflecting layer has at least one face formed by a group of metallized elementary surfaces, which are electrically insulated from one another, so as to reduce vibrations and heat dissipation by eddy currents, which occur in a metallized reflecting layer when the latter is exposed to a time-variable magnetic field. Preferably, the said elementary surfaces are produced by electro-machining.

According to a special feature, the heat shield is in the form of a tape and is then more particularly applicable to the thermal insulation of an object, the tape being wound in several thicknesses around the object. Obviously, the heat shield can be produced in the form of a tape or in the form of pieces separated in the manner described hereinafter. Moreover, the heat shield can be in "monolayer" form, i.e. only has one reflecting layer and one spacing layer, or in "multilayer" form, in accordance with the meaning given to this term hereinbefore.

Due to its limited density, it is very difficult to manipulate the tulle, as well as to fit it to the object when said tulle is in the free state.

The present invention also relates to a process for the production of the composite heat shield according to the invention. This process aims at joining the reflecting layer and the spacing layer. The thermally insulating assembly is then obtained and a multilayer shield can be obtained by superimposing a plurality of these thermally insulating assemblies.

The process involves simultaneously cutting the reflecting layer and the spacing layer, so as to form edges for the layers and then welding the layers together by their edges. Preferably, the cutting and welding operations are performed hot.

According to a special feature of the process according to the invention, cutting and welding are carried out on a surface on which the layers are held by reduced pressure.

According to another special feature, cutting and welding are performed by means of at least one heating knife.

According to another special feature, the process according to the invention also consists of carrying out a supplementary cutting and welding operation simultaneously at different points distributed over the layers, said operation involving the formation of studholes or incisions in said layers. This ensures the installation of large-area, superimposed layers and also aids the thermal insulation effect. Thus, to obtain a better thermal insulation of an object protected by a multilayer heat shield according to the invention, it may be decided to place the object and its shield in an enclosure and to produce a vacuum therein, which is facilitated by the presence of the studholes, particularly in the case of a very wide shield.

BRIEF DESCRIPTION OF THE DRAWINGS

The invention is described in greater detail hereinafter with reference to non-limitative embodiments and the attached drawings, wherein show:

FIG. 5a a diagrammatic view of an apparatus for forming the said metallized elementary surfaces on a reflecting layer.

FIG. 5b a diagrammatic view of part of the reflecting layer provided with the metallized elementary surfaces.

DETAILED DESCRIPTION OF THE PREFERRED EMBODIMENTS

Figure 1:
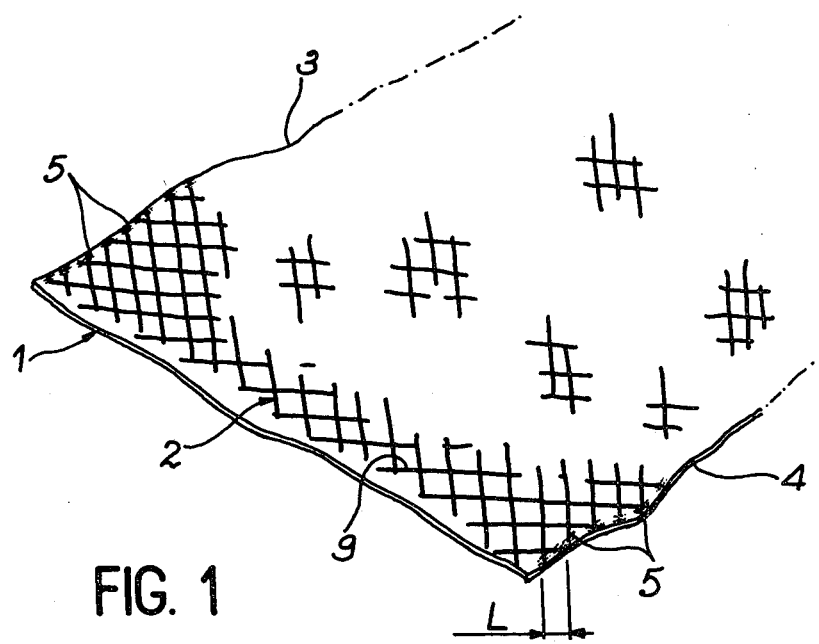
FIG. 1 a diagrammatic view of a thermally insulating assembly according to the invention.

FIG. 1 diagrammatically shows a thermally insulating assembly 1-2 or monolayer heat shield according to the invention. The shield comprises a reflecting layer 1 and a spacing layer 2. The latter is of tulle, produced with a monofilament thread. The reflecting layer 1 and spacing layer 2 are both formed from a material such as polyester or polyimide and are welded to one another by their edges 3 and 4 (which also stops fraying of the tulle) in accordance with a process described in connection with FIG. 3. The reflecting power of reflecting layer 1 is obtained by the metallization of both faces thereof (10 and 11 in FIG. 2), which is described in detail in connection with FIG. 2. It is also possible to see on edges 3 and 4, certain of the welds 5 having a negligible spacer-reflector thermal contact. During a temperature change, these welds do not fracture, due to the reflecting layer 1 and spacing layer 2 being made from the same material, have the same thermal properties and in particular the same heat expansion coefficient.

A material such as polyester or polyimide is used for producing the heat shield, because it permits the use of the latter at temperatures well above ambient temperature (approximately 20° C.). Thus, the polyimide makes it possible to produce a multilayer shield which still remains effective at 500° C.

Figure 2:
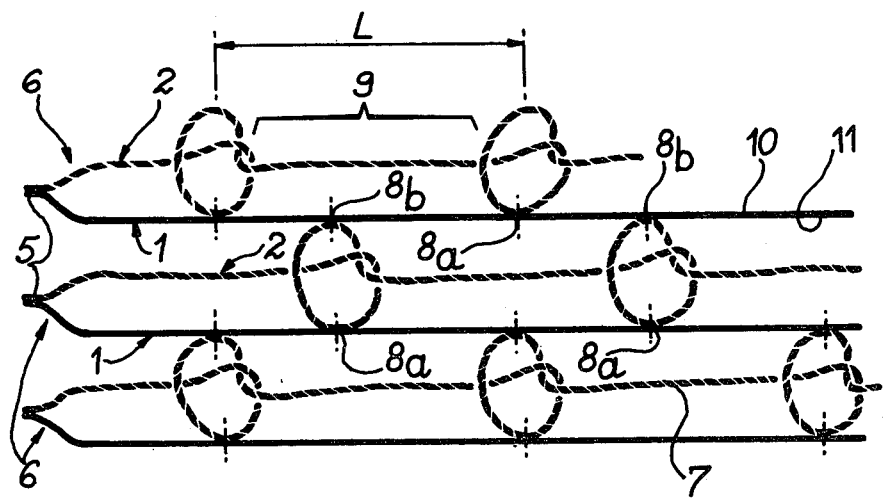
FIG. 2 a diagrammatic sectional view of part of a multilayer heat shield according to the invention.

FIG. 2 is a diagrammatic sectional view of part of a multilayer heat shield according to the invention. This shield results from the superimposing of monolayer heat shield 6 of the type shown in FIG. 1 and comprising in each case a reflecting layer 1, e.g. of polyester and a spacing layer 2 of polyester tulle produced by means of a monofilament thread 7. These two layers are welded to one another along their edges (3 and 4 in FIG. 1). FIG. 2 shows some of the welds 5 resulting therefrom. Thermal contact between a reflecting layer 1 and a spacing layer 2 is negligible as a result of the aforementioned welds, because there is a virtually non-existent contact surface between the layers at the location of these welds.

FIG. 2 also shows the contact points 8a between a spacing layer 2 belonging to one of the monolayer shields 6 and the reflecting layer 1 to which it is welded and the contact points 8b of the spacing layer 2 with reflecting layer 1 of monolayer shield 6 adjacent thereto. The tulle forming the spacing layer 2 has meshes 9 of considerable length L (FIGS. 1 and 2), hence the low density of the tulle. There are few contact points 8a and 8b as compared with the number obtained when using materials such as felt and gauze. Moreover, there is a considerable filamentary spread between the contact points 8a and 8b corresponding to two successive reflecting layers 1.

As stated hereinbefore, each reflecting layer 1 is metallized on both its faces 10 and 11. For example, the latter are covered with aluminium, i.e. a metal with a low atomic mass. Particularly in the case of a heat shield intended for thermally insulating a magnetometer for measuring a magnetic field, the total thickness of the aluminium coatings (reference 12 in FIG. 5b) of a reflective layer 1 and obviously the number of such layers 1 can be calculated in such a way that the heat shield is adapted to the wavelength of the incidence infrared radiation in such a way as to be able to reflect the latter and has a sufficiently low aluminium mass for the magnetic disturbance field produced by the thermal agitation of the aluminium conduction electrons (the field being proportional to the mass of the aluminium) to be negligible compared with the magnetic field to be measured, or is of the order of the background noise of the magnetometer.

For information and in a non-limitative manner, the following data can be used for a monolayer shield:

reflecting layer thickness (non-metallized): 2.5 to 3.5 $\mu$m, aluminium coating thickness: 100 to 400 Å (200 to 800 Å for the two coatings), tulle mesh length: approx. 3 mm, spacing layer thickness: approx. 0.8 mm.

The surface mass of the monolayer shield obtained is consequently approximately 13 g/m$^2$ (approximately 6 g/m$^2$ of reflecting layer and 7 g/m$^2$ of spacing layer), as compared with approximately 40 g/m$^2$ for the prior art monolayer shields.

Figure 3:
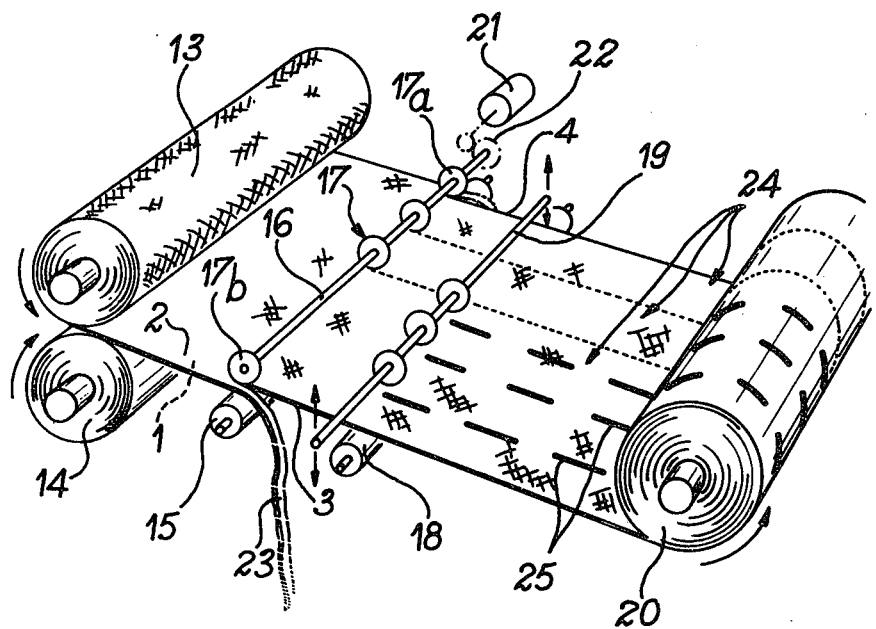
FIG. 3 a diagrammatic view of an apparatus for performing the process according to the invention.

FIG. 3 diagrammatically shows an apparatus for performing the process according to the invention. This apparatus essentially comprises a tulle (e.g. polyester) supply reel 13, a reel 14 for supplying polyester film aluminized on both its faces (and corresponding to reflecting layer 1), a first support roller 15 associated with a first shaft 16 placed above and carrying the circular heating knives 17, a second support roller 18 associated with a second shaft 19 placed above and carrying circular heating knives 17 and a winding reel 20. The circular heating knives 17, blanks of which are commercially available, comprise in each case e.g. a heating resistor (not shown) in the vicinity of their periphery and which is supplied with electric current by brushes (not shown). A motor 21 is used for rotating shaft 16 by means of pinions 22. A jack mechanism (not shown in FIG. 3) and which can be realised by the Expert, makes it possible to raise or lower the second shaft 19.

The reflecting and spacing layers 1, 2 are respectively unwound from supply reels 13, 14 (at a speed of e.g. approximately 30 to 40 cm/s), whereby they join to pass between the heating knives 17 of the first shaft 16 and the first roller support 15 used for supporting the layers. Two 17a, 17b of the circular heating knives 17 of first shaft 16 make it possible to cut the reflecting and spacing layers 1, 2, thus creating waste 23, whilst simultaneously welding these layers by their edges 3 and 4. The other heating knives 17 of the first shaft 16 are used for producing a plurality of monolayer heat shields 24, whose width is a function of the spacings of heating knives 17 and also by simultaneous cutting and welding. (The voltage for the reflecting and spacing layers 1, 2 must be sufficiently low, after cutting and welding and during the starting phase of the cooling of the welds obtained, to prevent disengagement of the latter. However, if certain of these welds break during the manipulation of the monolayer shields, this does not have a disadvantageous effect. There is always a sufficient quantity to permit the fixing of reflecting and spacing layers to one another and consequently the manipulation of the monolayer shields, the thermal contact points having as a result been further decreased in number).

The monolayer shields 24 formed then pass between the circular heating knives 17 of the second shaft 19 and the second support roller 18 which also supports the monoshields 24 formed. The circular heating knives 17 of the second shaft 19 make it possible to cut, if desired, incisions or studholes 25 (still by simultaneous cutting and welding) in certain of the monolayer shields 24. After this, the shields 24 formed (in tape form) are wound onto the winding reel 20.

The studholes 25 bring about an intermediate fixing of the two superimposed layers in the case of wide strips. They are also useful when it is desired to produce a multilayer heat shield by the superimposing of wide monolayer heat shields (e.g. roughly a few dozen centimeters).

Figure 4:
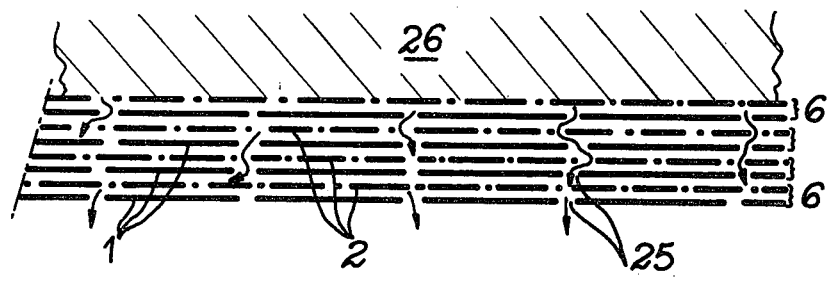
FIG. 4 a diagrammatic sectional view of a multilayer heat shield according to the invention and containing the aforementioned studholes.

FIG. 4 is a diagrammatic sectional view of such a multilayer heat shield for the thermal insulation of an object 26 and formed e.g. by winding a wide monolayer heat shield, of the type obtained in the form of a tape using the apparatus of FIG. 3, about the said object 26 with several thicknesses corresponding to monolayer heat shield 6. In an exemplified and non-limitative manner, one cm long studholes 25 are made in the tape with longitudinal and lateral spacings of 10 cm. These studholes 25 link the successive thicknesses 6 and make it possible to form a vacuum "through" the reflecting layers 1 in the multilayer shield. This vacuum eliminates gaseous thermal conduction, as well as gaseous thermal convection movements, which the size of the spacing meshes and the distance between the reflectors would not be able to reduce. It is obvious that thermal insulation based on such multiple radiation shields is of a very good quality and under vacuum.

Figure 5C:
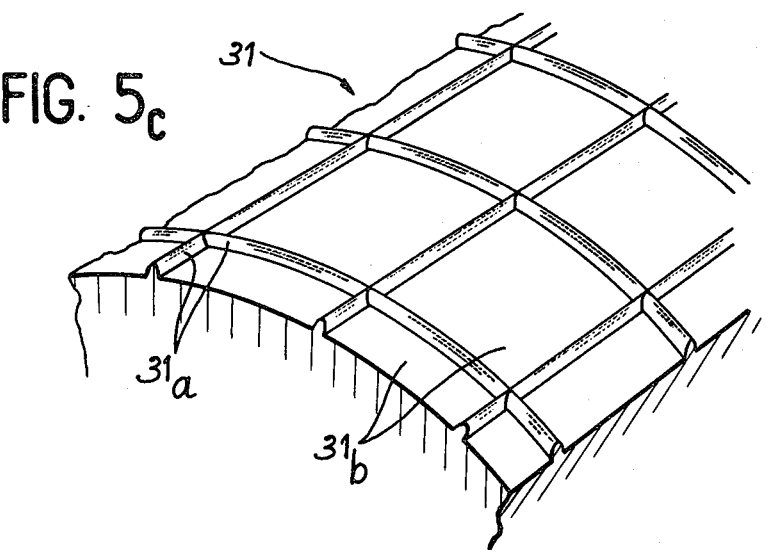
FIG. 5c a diagrammatic view of part of a roller making it possible to obtain the metallized elementary surfaces.

FIG. 5a diagrammatically shows an apparatus for forming metallized elementary areas or surfaces 27, which are electrically insulated from one another on faces 10 and 11 of a reflecting layer 1 using an electro-machining process. This apparatus essentially comprises a reel 28 for supplying a polyester film aluminized on both its faces and corresponding to the reflecting layer 1 to be treated, a first smooth electrode roller 29 associated with a first support roller 30 located below, a second electrode roller 31 associated with a second support roller 32 positioned below and a winding reel 33. The two electrode rollers 29, 31 are electrically conductive on their periphery. FIG. 5c diagrammatically shows part of the second electrode roller 31, which is provided on its periphery with a chequerwork 31a in relief, defining a plurality of square elementary surfaces 31b. A voltage, e.g. of approximately 40 V d.c. is produced between the two electrode rollers 29, 31 (FIG. 5a) by means of an electrical generator 34 supplying by electrical conductors 35 brushes 36a, 36b rubbing respectively on the periphery of the first electrode roller 29 and on that of the second electrode roller 31.

Reflecting layer 1 is unwound, with its face 10 turned upwards for example, from the supply reel 28 and then passes between the first electrode roller 29 and the first support roller 30, then between the second electrode roller 31 and the second support roller 32, after which it is wound onto the winding reel 33. An electric current circulates from the first electrode roller 29 to the second 31, whilst passing through the metal, e.g. aluminium covering face 10 of reflecting layer 1. It is face 10 which faces the two electrode rollers 29, 31. On passing beneath the second electrode roller 31, the aluminium is removed from face 10 of reflecting layer 1 at the points corresponding to the chequerwork 31a of FIG. 5c.

When face 10 has been treated, it is then possible to treat the other face 11 of reflecting layer 1, after which layer 1 can be assembled with a spacing layer in the manner described relative to FIG. 3.

FIG. 5b diagrammatically shows part of the reflecting layer 1 treated by electro-machining. Reflecting layer 1 comprises an e.g. polyester film 37, on each face 10, 11 of which is arranged an aluminium coating 12. The aluminium is partly removed by the electro-machining of faces 10 and 12, so that at the points from which it is removed, a chequerwork of intaglio passages 27a, which are perpendicular to one another appears and these passages define the elementary square surfaces 27 corresponding to the remaining aluminium, said surfaces being electrically insulated from one another by the passages 27a. The relief chequerwork 31a (FIG. 5c) is provided so that the aluminized surface is much larger than that which is no longer aluminized after electro-machining. For example, the elementary square surfaces 27 can be approximately 5 mm and the width of the passages 27a approximately 0.3 mm. As stated hereinbefore, the subdivision of the metallized faces 10 and 11 into elementary metallized area or surfaces 27, which are electrically insulated from one another, makes it possible to reduce vibrations and thermal dissipation by eddy currents in the metallic coatings 12 of faces 10 and 11 (FIG. 5b) when reflecting layer 1 is exposed to a time-variable magnetic field perpendicular to its plane. The magnitude of these vibrations or thermal dissipations (by Joule effect) is linked with the frequency of the field and the electrical impedance of the induction loops.

Figure 6:
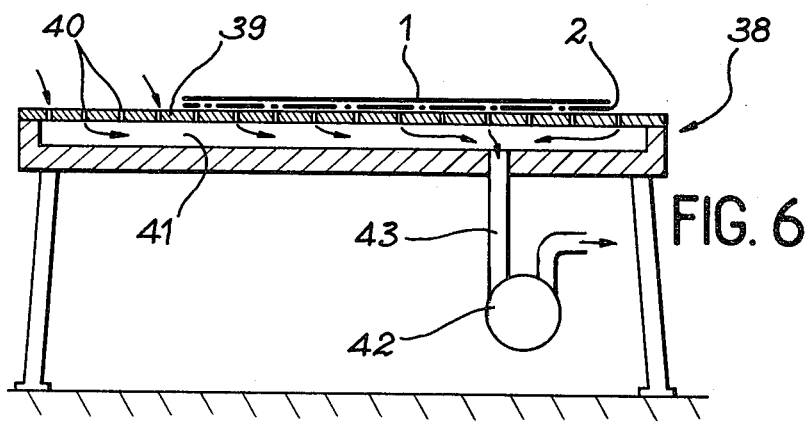
FIGS. 6 and 6a diagrammatic views of other means for performing the process according to the invention.

FIG. 6 diagrammatically shows another apparatus for performing the process according to the invention. This apparatus essentially comprises a table 38 having a planar surface 39 with holes 40 communicating with a cavity 41 to which is connected a vacuum vane pump 42 via a duct 43. On planar surface 39 can be placed a spacing layer 2 and on the latter a reflecting layer 1. When the pump is operating, air is sucked in through holes 40 and reflecting layer 1 is engaged with the planar surface 38, as is spacing layer 2. For example, by means of a not shown heating knife or a $CO_2$ power laser, it is then possible to simultaneously cut and weld the two layers 1 and 2 for forming monolayer thermal shields having different shapes permitting the thermal insulation e.g. of objects, whose outer surface cannot be developed. The heating knife can be moved either manually or with the aid of per se known mechanical means.

Figure 6A:
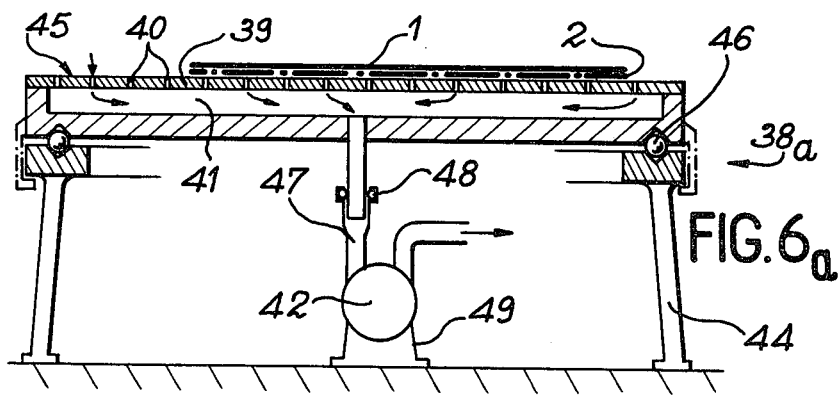

The table can be movable, e.g. can rotate, so as to make it unnecessary for the person cutting the shields to move. This is the case with table 38a shown diagrammatically in FIG. 6a. Table 38a comprises a frame 44 on which can rotate a plate 45 with the aid of bearings 46, e.g. ball bearings. As hereinbefore, plate 45 has a planar surface 39 with holes 40 communicating with a cavity 41 in plate 45 and connected via a duct 47 with a rotary passage 48 to a vane pump 42 resting on support 49. It is also possible to simultaneously cut and weld the reflecting and spacing layers on a table (e.g. of the type used by draughtsmen) covered by a non-adhesive, refractory plate, by immobilizing them there by means of non-adhesive, refractory rules which are also used as guides in the cutting and welding operations.

Thus, the invention not only proposes composite heat shields having a thermal conductivity much higher than that of the hitherto known shields, but also a process for producing such shields making it possible to solve the difficult problem of the handling of the tulle used for forming the spacing layers of such shields. Without damage, the latter can withstand vibrations corresponding to frequencies of 0 to 2000 Hz and accelerations of at least 23 g (g being approximately 9.8 m/s$^2$), applied in the three spatial axes for at least 17 s, or integrally take up their position again after being accidentally exposed to an acceleration of 150 g.

What is claimed is:

1. A heat shield comprising at least one thermally insulating assembly formed by a reflecting layer and a spacing layer, wherein the spacing layer is made from tulle, and wherein the spacing layer and the reflecting layer are welded to one another at their edges.

2. A heat shield according to claim 1, wherein the tulle is produced with a monofilament thread.

3. A heat shield according to claim 1 comprising several superimposed ones of said thermally insulating asemblies wherein there are successive reflecting layers and wherein the space between said successive reflecting layers is under vacuum.

4. A heat shield according to claim 1, wherein each said reflecting layer comprises a film made of a material from the group consisting of polyesters and polyimides, said film being metallized on at least one of its faces.

5. A heat shield according to claim 4, wherein the spacing layer is made from the same material as the film of the reflecting layer.

6. A heat shield according to claim 1, wherein each reflecting layer comprises two metallized faces.

7. A heat shield according to claim 1, wherein each reflecting layer comprises on at least one of its faces, a metallic coating subdivided into a plurality of areas separated from one another by passages.

8. A heat shield according to claim 1, wherein it is in the form of a tape.

9. An application of the heat shield according to claim 8 to the thermal insulation of an object, the tape being wound around the said object in several thicknesses.

* * * * *